United States Patent
Stedman et al.

(10) Patent No.: US 8,863,268 B2
(45) Date of Patent: Oct. 14, 2014

(54) SECURITY MODULE AND METHOD WITHIN AN INFORMATION HANDLING SYSTEM

(75) Inventors: Roy W. Stedman, Austin, TX (US); Andrew T. Sultenfuss, Leander, TX (US); David Loadman, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 1422 days.

(21) Appl. No.: 12/260,519

(22) Filed: Oct. 29, 2008
(Under 37 CFR 1.47)

(65) Prior Publication Data
US 2010/0107238 A1    Apr. 29, 2010

(51) Int. Cl.
| | | |
|---|---|---|
| G06F 7/04 | (2006.01) | |
| H04L 29/06 | (2006.01) | |
| H04W 4/02 | (2009.01) | |
| H04L 29/08 | (2006.01) | |
| G06F 21/34 | (2013.01) | |
| G06F 21/62 | (2013.01) | |
| G06F 21/32 | (2013.01) | |

(52) U.S. Cl.
CPC .............. *G06F 21/32* (2013.01); *H04W 4/02* (2013.01); *H04L 67/18* (2013.01); *G06F 2221/2153* (2013.01); *G06F 21/34* (2013.01); *G06F 2221/2111* (2013.01); *G06F 2221/2149* (2013.01); *G06F 21/62* (2013.01)
USPC .............. 726/13; 726/11; 726/12; 726/14; 726/15; 713/168; 713/169; 713/170; 713/171; 713/172

(58) Field of Classification Search
USPC ......................................................... 726/13
See application file for complete search history.

(56) References Cited

U.S. PATENT DOCUMENTS

| | | |
|---|---|---|
| 4,720,798 A | 1/1988 | Reed et al. |
| 4,747,041 A | 5/1988 | Engel et al. |
| 4,809,163 A | 2/1989 | Hirosawa et al. |
| 5,251,320 A | 10/1993 | Kuzawinski et al. |
| 5,303,171 A | 4/1994 | Belt et al. |
| 5,586,270 A | 12/1996 | Rotier et al. |
| 5,644,760 A | 7/1997 | Polzin et al. |
| 5,727,231 A | 3/1998 | Bartley et al. |
| 5,748,912 A | 5/1998 | Lee |

(Continued)

FOREIGN PATENT DOCUMENTS

| | | |
|---|---|---|
| EP | 1 460 529 A2 | 9/2004 |
| WO | WO 2007/004178 A1 | 1/2007 |

OTHER PUBLICATIONS

U.S. Appl. No. 12/039,872, filed Feb. 29, 2008.
U.S. Appl. No. 12/188,994, filed Aug. 8, 2008.

(Continued)

*Primary Examiner* — Longbit Chai
(74) *Attorney, Agent, or Firm* — Larson Newman, LLP

(57) ABSTRACT

A security module and method within an information handling system are disclosed. In a particular form, a processing module can include a local processor configurable to initiate access to resources of a host processing system. The processing module can also include a security module configured to enable use of the resources of the host processing system using a security metric. According to an aspect, the security module can be further configured to detect the security metric, and enable access to a resource of the host processing system in response to the security metric. The security module can further be configured to disable access to another resource of the host processing system in response to the security metric.

20 Claims, 7 Drawing Sheets

(56) References Cited

U.S. PATENT DOCUMENTS

| | | | |
|---|---|---|---|
| 5,835,732 A | 11/1998 | Kikinis et al. | |
| 5,919,264 A | 7/1999 | Reneris | |
| 5,951,688 A | 9/1999 | Moyer et al. | |
| 5,999,997 A | 12/1999 | Pipes | |
| 6,029,211 A | 2/2000 | Nakashima | |
| 6,078,967 A | 6/2000 | Fulghum | |
| 6,233,692 B1 | 5/2001 | Villanueva | |
| 6,411,825 B1 | 6/2002 | Csapo et al. | |
| 6,457,129 B2 * | 9/2002 | O'Mahony | 726/4 |
| 6,523,079 B2 | 2/2003 | Kikinis et al. | |
| 6,549,968 B1 | 4/2003 | Hart | |
| 6,584,533 B1 | 6/2003 | Cho et al. | |
| 6,586,849 B2 | 7/2003 | Tarr | |
| 6,608,400 B1 | 8/2003 | Muehsam | |
| 6,640,268 B1 | 10/2003 | Kumar | |
| 6,732,216 B2 | 5/2004 | Shaw | |
| 6,735,663 B2 | 5/2004 | Watts, Jr. et al. | |
| 6,735,708 B2 | 5/2004 | Watts, Jr. | |
| 6,760,852 B1 | 7/2004 | Gulick | |
| 6,801,974 B1 | 10/2004 | Watts, Jr. et al. | |
| 6,816,925 B2 | 11/2004 | Watts, Jr. | |
| 6,826,391 B2 | 11/2004 | Leinonen et al. | |
| 6,898,727 B1 | 5/2005 | Wang et al. | |
| 7,010,634 B2 | 3/2006 | Silveser | |
| 7,149,837 B2 | 12/2006 | Watts, Jr. et al. | |
| 7,197,584 B2 | 3/2007 | Huber et al. | |
| 7,281,148 B2 | 10/2007 | Munguia | |
| 7,305,501 B2 | 12/2007 | Lee | |
| 7,380,142 B2 | 5/2008 | Lee et al. | |
| 7,636,560 B2 | 12/2009 | Ku | |
| 7,720,506 B1 | 5/2010 | Gribble | |
| 2002/0103005 A1 | 8/2002 | Watts, Jr. et al. | |
| 2003/0065734 A1 | 4/2003 | Ramakesavan | |
| 2003/0110306 A1 | 6/2003 | Bailis et al. | |
| 2003/0135803 A1 | 7/2003 | Hong | |
| 2003/0176176 A1 | 9/2003 | Leinonen et al. | |
| 2004/0063425 A1 | 4/2004 | Wakutsu et al. | |
| 2004/0088262 A1 | 5/2004 | Boucher et al. | |
| 2004/0160435 A1 | 8/2004 | Cui et al. | |
| 2004/0162107 A1 | 8/2004 | Klemetti et al. | |
| 2004/0203709 A1 | 10/2004 | Luneau | |
| 2004/0219932 A1 | 11/2004 | Verteuil | |
| 2004/0268005 A1 | 12/2004 | Dickie | |
| 2005/0066006 A1 | 3/2005 | Fleck et al. | |
| 2005/0138267 A1 | 6/2005 | Bains et al. | |
| 2005/0240702 A1 | 10/2005 | Kunkel et al. | |
| 2006/0021007 A1 * | 1/2006 | Rensin et al. | 726/2 |
| 2006/0026447 A1 | 2/2006 | Naveh et al. | |
| 2006/0075491 A1 * | 4/2006 | Lyon | 726/22 |
| 2006/0079275 A1 | 4/2006 | Ella et al. | |
| 2006/0236014 A1 | 10/2006 | Yin et al. | |
| 2007/0030967 A1 * | 2/2007 | Earnshaw | 380/209 |
| 2007/0094435 A1 | 4/2007 | Fry et al. | |
| 2007/0213105 A1 | 9/2007 | Huber et al. | |
| 2008/0004889 A1 | 1/2008 | Edwards et al. | |
| 2008/0016167 A1 * | 1/2008 | Lund et al. | 709/206 |
| 2008/0070593 A1 | 3/2008 | Altman et al. | |
| 2008/0100712 A1 | 5/2008 | Hayes et al. | |
| 2008/0140872 A1 | 6/2008 | Wright | |
| 2008/0183857 A1 | 7/2008 | Barfield et al. | |
| 2008/0272880 A1 | 11/2008 | Sutardja et al. | |
| 2009/0125732 A1 | 5/2009 | Oya et al. | |

OTHER PUBLICATIONS

U.S. Appl. No. 12/189,000, filed Aug. 8, 2008.
U.S. Appl. No. 12/189,005, filed Aug. 8, 2008.
U.S. Appl. No. 12/189,006, filed Aug. 8, 2008.
Garbee et al., "Platform-based Power Management and Linux," HP Development Company; 2010.
Hewlett-Packard, "Power Regulator for ProLiant," Technology Overview, Rev. 2; Jun. 2005.
Actel Corporation, "Total System Power: Evaluating the Power Profile of FPGAs," 2008.

* cited by examiner

SECURITY MODULE AND METHOD WITHIN AN INFORMATION HANDLING SYSTEM

FIELD OF THE DISCLOSURE

This disclosure relates generally to information handling systems, and more particularly to a security module and method within an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can be configured to use a variety of hardware and software components that can be configured to process, store, and communicate information and can include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
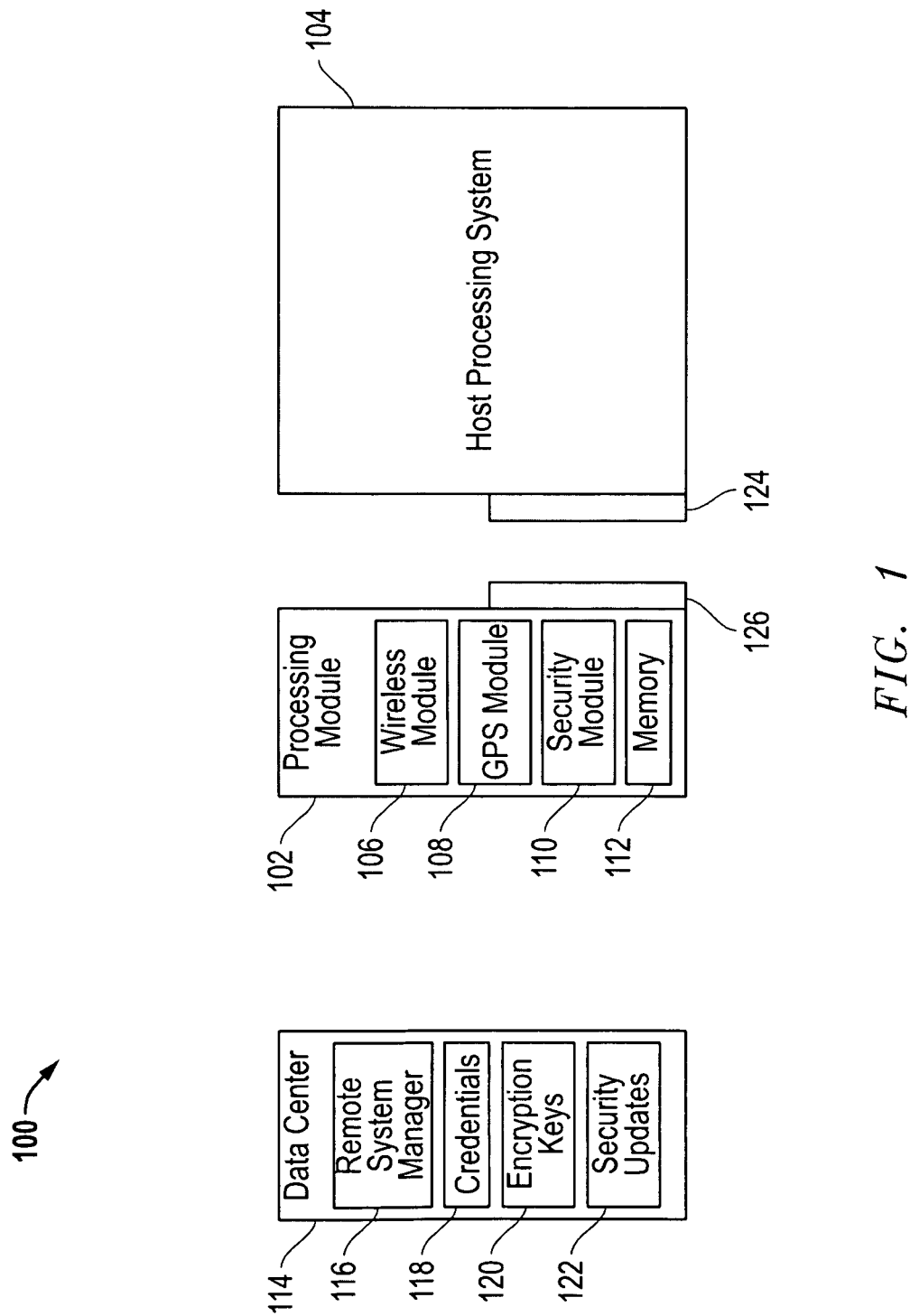
FIG. 1 illustrates a functional block diagram of an information handling system employing a processing module operable to be coupled to a data center according to an aspect of the disclosure.

The following description in combination with the figures is provided to assist in understanding the teachings disclosed herein. The following discussion will focuses on specific implementations and embodiments. This focus is provided to assist in describing the teachings and should not be interpreted as a limitation on the scope or applicability of the teachings. However, other teachings can certainly be used in this application. The teachings can also be used in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

Portions of an information handling system, when referred to as a "device," a "module," or the like, can be configured as hardware, software (which can include firmware), or any combination thereof. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). Similarly, the device could be software, including firmware embedded at a device, such as a Pentium class or PowerPC™ brand processor, or other such device, or software capable of operating a relevant environment of the information handling system. The device could also be a combination of any of the foregoing examples of hardware or software. Note that an information handling system can include an integrated circuit or a board-level product having portions thereof that can also be any combination of hardware and software.

Devices or programs that are in communication with one another need not be in continuous communication with each other unless expressly specified otherwise. In addition, devices or programs that are in communication with one another may communicate directly or indirectly through one or more intermediaries.

Embodiments discussed below describe, in part, distributed computing solutions that manage all or part of a communicative interaction between network elements. In this context, a communicative interaction may be intending to send information, sending information, requesting information, receiving information, receiving a request for information, or any combination thereof. As such, a communicative interaction could be unidirectional, bidirectional, multi-directional, or any combination thereof. In some circumstances, a communicative interaction could be relatively complex and involve two or more network elements. For example, a communicative interaction may be "a conversation" or series of related communications between a client and a server—each network element sending and receiving information to and from the other. The communicative interaction between the network elements is not necessarily limited to only one specific form. A network element may be a node, a piece of hardware, software, firmware, middleware, another component of a computing system, or any combination thereof.

In the description below, a flow charted technique may be described in a series of sequential actions. Unless expressly stated to the contrary, the sequence of the actions and the party performing the actions may be freely changed without departing from the scope of the teachings. Actions may be added, deleted, or altered in several ways. Similarly, the actions may be re-ordered or looped. Further, although processes, methods, algorithms or the like may be described in a sequential order, such processes, methods, algorithms, or any combination thereof may be operable to be performed in alternative orders. Further, some actions within a process, method, or algorithm may be performed simultaneously during at least a point in time (e.g., actions performed in parallel), can also be performed in whole, in part, or any combination thereof.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single device is described herein, more than one device may be used in place of a single device. Similarly, where more than one device is described herein, a single device may be substituted for that one device.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

To the extent not described herein, many details regarding specific materials, processing acts, and circuits are conventional and may be found in textbooks and other sources within the computing, electronics, and software arts.

An information handling system and method of using it are described below. An exemplary, non-limiting system description is described before addressing methods of using it. Some of the functionality of modules within the system is described with the system. The utility of the system and its modules will become more apparent with the description of the methods that follow the description of the system and modules.

According to an aspect of the disclosure, a processing module can include a local processor configurable to initiate access to resources of a host processing system. The processing module can also include a security module configured to enable use of the resources of the host processing system using a security metric. According to an aspect, the security module can be further configured to detect the security metric, and enable access to a resource of the host processing system in response to the security metric. The security module can further be configured to disable access to another resource of the host processing system in response to the security metric.

According to another aspect of the disclosure, a method is disclosed. The method can include detecting an operating state of an information handling system, and detecting a global location of the information handling system. The method can also include comparing the global location to a list of valid global locations, and altering an operating state of a resource of the information handling system in response to the comparison and a current operating state of the information handling system.

According to another aspect, an information handling system is disclosed. The information handling system can include a host processing system including resources operable to be enabled and disabled by a processing module. The host interface can be configured to couple the processing module to the host processing system. The host interface can further be configured to receive a signal from the processing module to initiate enabling and disabling resources of the host processing system in response to a security metric value detected by a security module of the processing module.

FIG. 1 illustrates a functional block diagram of an information handling system employing a processing module operable to be coupled to a data center according to an aspect of the disclosure. An information handling system, generally illustrated at 100, can also be realized, in whole or in part, as the information handling system 200 illustrated in FIG. 2, the information handling system 400 illustrated in FIG. 4, the information handling system 500 illustrated in FIG. 5, or any other information handling system.

According to an aspect, the information handling system 100 can include a processing module 102 operably coupled to a host processing system 104. The processing module 102 can include a wireless module 106, a global positional system (GPS) module 108, a security module 110, and a memory 112. According to an aspect, the processing module 102 can include the processing module 400 illustrated in FIG. 4. The processing module 102 can further be coupled to a data center 114 via wireline or wireless communication. The data center 114 can include a remote system manager 116, a credential database 118, an encryption keys database 120, and a security updates database 122. The data center 114 can be configured to store other databases as needed or desired.

According to another aspect, the host processing system 104 can include a host interface 124 configured to be coupled to a processing module interface 126 of the processing module 102. The processing module 102 can be used to selectively enable and disable resources of the host processing system 102 based on a desired operating state. For example, the host processing system 104 can be placed in a reduced operating state that can include powering down a host processor (not illustrated) of the host processing system 104 and various other power consuming components, devices, etc. For example, the host processing system 104 can be placed in hibernate, standby, off, or various other reduced operating states. The processing module 102 can further be used to enable resources of the host processing system 104 using various security metrics. For example, a security metric can include a global location within a cellular, wireless, network, or GPS network, user credentials, date/time of access, availability of encryption keys or other security data, enterprise access or file security and availability, eminent domain and operating conditions of the processing module 102, the host processing system 102, or any combination thereof. The security metric can further be used to enable, disable, or alter an operating condition of resources within the host processing system 104, the processing module 102, the data center 114, or any combination thereof.

According to another aspect, resources that may be disabled prior to the processing module 102 disabling can remain disabled. For example, the processing module 102 can initiate disabling a resource, can detect whether the resource may be disabled, and the resource can remain in a disabled state. As such, disabling resources need not include enabling a resource prior to the processing module 102 disabling. Similarly, resources that may be enabled prior to the processing module 102 enabling can remain enabled. For example, the processing module 102 can initiate enabling a resource, can detect whether the resource may be enabled, and the resource can remain in an enabled state. As such, enabling resources need not include disabling a resource prior to the processing module 102 enabling. Additionally, enabling and disabling need not be limited to resources and can also include modules, components, shared resources, non-shared resources, or any combination thereof.

According to an aspect, eminent domain can be used during operation of the information handling system 100. For example, the processing module 102 can have eminent domain over the host processing system 104. As such, the processing module 102 can control aspects of the host processing system 104, and can serve as a primary communication interface with the data center 1 14. Additionally, the processing module 102 can access, enable, modify, operating states of resources within the host processing system 104. In other forms, the host processing system 104 can have eminent domain over the processing module 102.

Figure 2:
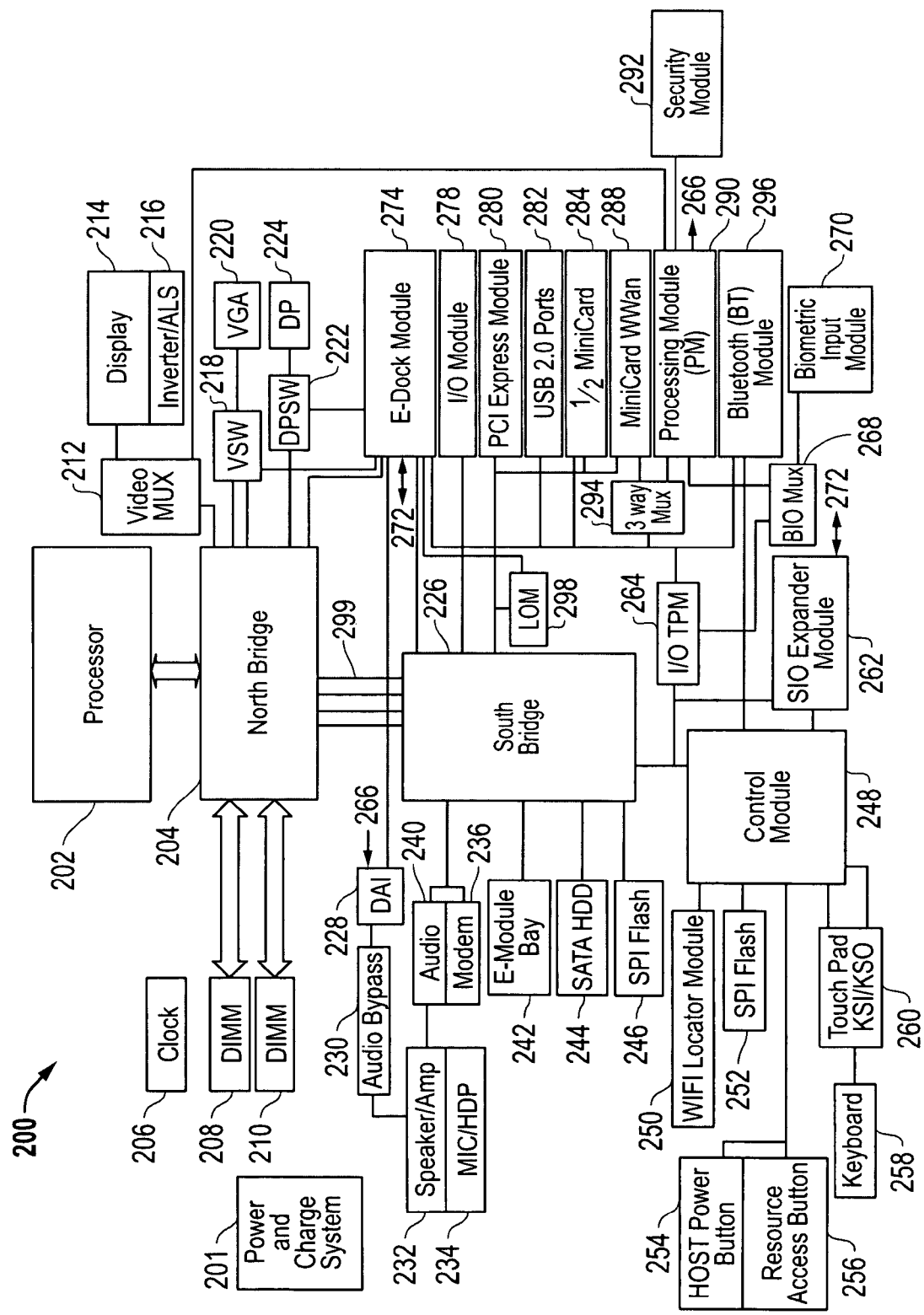
FIG. 2 illustrates a functional block diagram of an information handling system employing a processing module configured to output video during a reduced operating state according to an aspect of the disclosure.

FIG. 2 illustrates a functional block diagram of an information handling system employing a processing module according to an aspect of the disclosure. The information handling system 200 can include a processor 202, coupled to a north bridge 204. A clock 206 can output a timing signal to the processor 202 and other components or resources of the information handling system 200 as needed or required. The north bridge 204 can be further coupled to a dual in-line memory module (DIMM) 208 and a DIMM 210. The north bridge 204 can also be coupled to a video multiplexer (Video MUX) 212 operable to multiplex and output video signals to be displayed using a display 214. The display 214 can include an inverter and automatic light sensor (ALS) module 216. The north bridge 204 can be further coupled to a video switch (VSW) module 218 and a video graphics array (VGA) port 220. A display port (DP) 224 can be coupled to a display port switch (DPSW) 222 operable to be coupled to the north bridge 204, and a docking module such as an E-Dock module 274 or other docking modules. For example, the E-Dock module 274 or docking module can be used to expand resources of the information handling system 200, and in various forms, enable access to a battery or charge source, a media slice, an I/O box, a printer interface, or various other resources that can be accessed when docking the information handling system 200 to a docking module.

The information handling system 200 can also include a south bridge 226 coupled to the north bridge 204 using a data bus 299. A digital audio interface (DAI) module 228 can receive a digital audio signal from an input source 266. In an aspect, a remote processing module 290 or other modules can be coupled to the DAI 228 to input a digital audio signal as the input source 266. For example, the DAI module 228 can also be coupled to an E-Dock source 274. An audio bypass 230 can be further coupled to a speaker and amplifier 232, and a microphone and headphone (MIC/HDP) 234. The south bridge 226 can also be coupled to a modem 236 such as an RJ-11 or plain old telephone system (POTS) enabled modem, and an audio output module 240 operable to couple audio output signals using the south bridge 226.

The south bridge 226 can be coupled to the E-Module bay 242 which can include a bay or cavity that can be used to enable couple and decouple resources that can access an internal bus of the information handling system 200 and can be further coupled to the south bridge 226. For example, the E-Module bay 242 can be coupled to the south bridge 226 using a multiplexer such as 3-way Mux 294 operable to couple a resource coupled to E-Module bay 242. Examples of resources can include disk drives, optical drives, batteries, I/O expander modules, smart card readers, and various combinations thereof. The information handling system 200 further includes a serial advanced technology attachment hard disk drive (SATA HDD) 244, and a serial peripheral interface (SPI) flash memory 246. The south bridge 226 can also be coupled to a serial I/O (SIO) integrated flash module 248. The SIO integrated flash module 248 can be coupled to a wireless fidelity (WIFI) locator module 250 which can refer to any type of 802.11x or any other short-range wireless communication. The SIO integrated flash module 248 can also be coupled to an SPI flash module 252, a host power button 254, and a resource access button interface 256 that can include one or more resource access buttons. The SIO integrated flash module 248 can also be coupled to a keyboard 258 and touchpad and KSI/KSO module 260. An SIO expander module 262 can also be coupled to the SIO integrated flash module 248 and can further be coupled to an I/O trusted platform module (TPM) 264. The I/O TPM 264 can further be coupled to a biometric multiplexer (BIO MUX) 268, and a biometric input 270 operable to detect user biometrics (e.g. fingerprint recognition, face recognition, iris detection, EKG/heart monitoring, etc.). The information handling system 200 can also include a security engine (not illustrated) that can be coupled to the biometric inputs using the PM 290 that can enable and disable access to portions or all of the information handling system 200. According the an aspect, the north bridge 204, the south bridge 226, various other components, or any combination thereof can be realized as the same chipset or device and need not be provided as a separate components.

According to an aspect, the E-Dock module 274 can also be coupled to the SIO integrated flash module 248 and SIO expander module 262 via interface 272. The south bridge 226 can further be coupled to an I/O module 278, a peripheral computer interconnect (PCI) express module 280 using a PCI express bus. The south bridge 226 can further be coupled to universal serial bus (USB) 2.0 access ports 282 via a host USB bus. A ½ Mini Card module 284 and a Minicard wireless wide area network (WWAN) module 288 can also be coupled to the south bridge 226 using a PCI express bus.

The information handling system 200 can further include a processing module PM 290 including a security module 292. PM 290 can be realized as processing module 102 described in FIG. 1, PM 400 described in FIG. 4, PM 502 described in FIG. 5, or any other module as needed or desired. PM 290 can further be configured to output a video signal to the video MUX 212 to output to the display 214. The PM 290 can also be coupled to a three (3) way multiplexer 294. The three (3) way multiplexer 294 can multiplex USB signals of the Minicard WWAN 288, the PM 290, and the USB bus coupled to the south bridge 204. The south bridge 226 can further be coupled to a Bluetooth (BT) module 296 via the USB bus. The south bridge 226 can also be coupled to a local area network (LAN) on Motherboard (LOM) 298 via a PCI express bus of the information handling system 200. The LOM 298 can also be coupled to the PCI express module 280. The information handling system 200 also includes a power and charge system 201 operable to distribute power to each component of the information handling system 200, and charge rechargeable power sources of the information handling system 200.

According to a further aspect, the PM 290 can be coupled to a display interface 205, display module 203 and a display 207. The display interface 205 can further be coupled to the three (3) way MUX 294. The display module 203 can further be coupled to an input interface 209 that can include an array of inputs. According to an aspect, the input interface 209 can include a touch screen interface and controller coupled to the display module 203 and display 207. According to an aspect, the Minicard WWAN 288 and the PM 290 can be realized as the same module or device and can be coupled to the information handling system 200 using a Minicard WWAN enabled interface.

During operation, PM 206 can be configured to detect a user initiated event, a non-user initiated event, network events, clock events, location events, timer events, power events, security events, system update events, departure of network access, network bandwidth capabilities, network security levels, power states, or any combination thereof. The PM 206 can be used to enable, disable, alter operating conditions, or any combination thereof of the information handling system 200.

For example, user, non-user, network events, of various other activities can be used to alter an operating condition of the information handling system 200. According to an aspect, a user initiated event can include a user activating a key, button, or other type of hardware, software, or user selectable interface, or combinations thereof, that can generate a user activated event. For example, a user can select a button to access a messaging application of the information handling system 200. As such, the PM 290 can detect a request to access the messaging application and the PM 290 can initiate access to resource of the information handling system 200 during a reduced operating state of the information handling system 200.

According to another aspect, the PM 290 can detect a non-user initiated event. For example, the information handling system 200 can employ the Minicard WWAN 288 operable to receive communication signals via a wireless communication. The Minicard WWAN 288, coupled to the PM 290, can detect the non-user initiated event. The control module 248, the PM 290, or any combination thereof can identify a resource profile (not illustrated) of the detected event, and initiate activation of resources of the information handling system 200 to process the non-user initiated event. In another form, a software update can be received and an update can be initiated without user intervention. In another form, an auto-power off feature can be used with a GPS feature. According to a further aspect, non-user initiated events, user initiated events, or any combination thereof can be detected.

According to an aspect, a resource profile can include a listing of resources of the information handling system 200 sufficient to process an event. The PM 104 and the control module 248 can initiate activation of resources based on the resource profile using the detected event, and resources available to process the event. As such, the information handling system 200 need not be initialized to process all events, and a limited amount of resources can be activated.

In another form, the information handling system 200 can detect a non-user initiated event communicated to an electronic device other than the information handling system 200 during a reduced operating state of the information handling system 200. For example, the PM 290 can be configured to detect a message formatted to be received by a smart phone device, Blackberry device, or any type of electronic device configured to receive messages.

In an exemplary form, the information handling system 200 can be operating in a low-power operating state that can include sufficient resources to detect a wireless signal. As such, the PM 290 can determine a current operating state of the information handling system 200, and can initiate enabling resources to process and output a response to the received wireless signal. As such, an operating environment to output a response to a message, such as a Blackberry message, can be enabled using a limited amount of resources without having to initialize additional resources of the information handling system 200. For example, the PM 290 in combination with the control module 248 can be used to enable access to the display 214 to output a received message. Additionally, the keyboard 258 or other input devices of the information handling system 200 can be powered to enable a user to view and respond to a message. As such, a limited resource operating environment can be generated to enable receipt and response to messages without having to initialize the information handling system 200. In the manner, the information handling system 200 can be realized as a laptop or notebook system that can be used to receive messages that may be intended for a Blackberry or other type of messaging device, thereby allowing a user to view messages using a larger display relative to the Blackberry device or smart phone device, and draft and respond to messages using the keyboard 258 and the display 214 as desired.

According to a further aspect, network communications received by the information handling system 200 can be coupled to the PM 290 and verified using the PM 290 and security module 292. For example, network data received by the MiniCard WWAN 288 can be coupled to the PM 290. Other network communication devices can also be coupled to the PM 290. The PM 290 and the security module 292, alone or combined, can detect whether the a global network location of the network data may be valid prior to allowing various other components of the information handling system 200 access to the network data. In this manner, the PM 290 can initiate filtering data that may be received from an invalid global network location, thereby increasing security of the information handling system 200.

Figure 3:
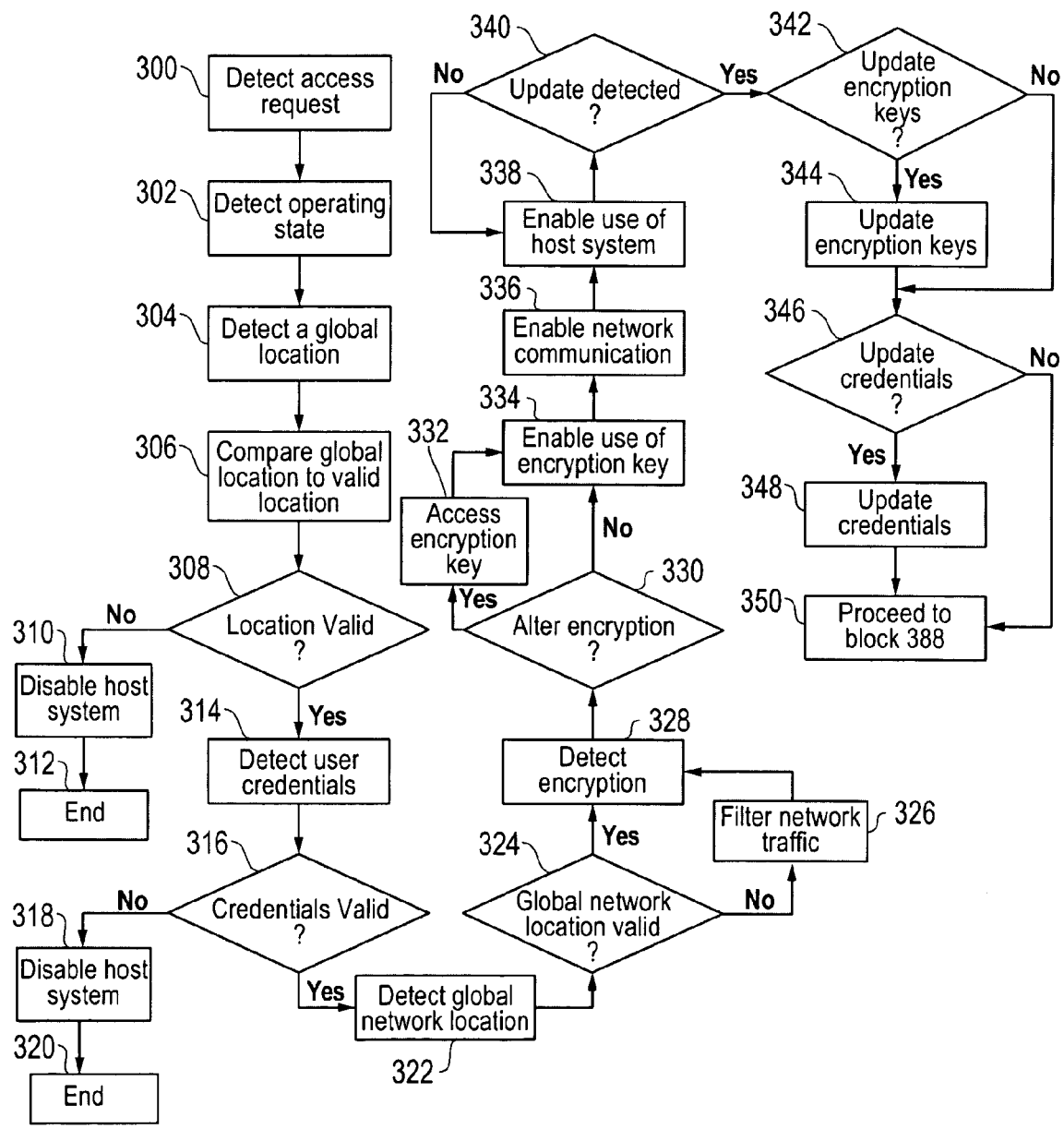
FIG. 3 illustrates a flow diagram of a method of enabling security using a processing module according to an aspect of the disclosure.

FIG. 3 illustrates a flow diagram of a method of processing video information using a processing module according to an aspect of the disclosure. FIG. 3 can be employed in whole, or in part, by the information handling system 100 depicted in FIG. 1, the information handling system 200 described in FIG. 2, the processing module 400 described in FIG. 4, the information handling system 500 illustrated in FIG. 5, or any other type of system, controller, device, module, processor, or any combination thereof, operable to employ all, or portions of, the method of FIG. 3. Additionally, the method can be embodied in various types of encoded logic including software, firmware, hardware, or other forms of digital storage mediums, computer readable mediums, or logic, or any combination thereof, operable to provide all, or portions of, the method of FIG. 3.

The method can begin at block 300, as a request to detect a request to access an information handling system. For example, a user may select a power-on button, function button, or various other inputs that can initiate a request to access a host processing system. Other inputs as described in FIGS. 1, 2, 4-5 can also be detected. According to another aspect, a processing module can detect a request and can initiate processing the request to determine whether the request may be authenticated or valid as described below. In another form, the processing module can detect the request to access the host processing system and can further detect which resources of the host processing system may be enabled, disabled, or any combination thereof.

Upon detecting a request to access the information handling system, the method can proceed to block 302 and detects an operating state. For example, an information handling system may be in a run time operating mode, stand-by, low-power, or other operating state. According to another aspect, a host processing system of an information handling system can be operating in a low-power state, and a processing module coupled to the host processing system can be used to enable and disable resources of the host processing system based on a current operating state.

The method can then proceed to block 304, and can detect a global position of the information handling system. For example, a host processing system of the information handling system can include a GPS module operable to detect a global position of the information handling system. In one form, the GPS module can communicate with a GPS location network. However, in other forms, the GPS module can be used with a WAN module operable to detect a GPS location using WAN signals. Any combination of GPS capabilities, networks, modules, can be used to detect a GPS location as needed or desired. In another form, a processing module coupled to a host processing system can include a GPS module operable to detect a location of the information handling system. Upon detecting a global location, the method can proceed to block 306, and can compare the global location to one or more valid locations to determine whether the current global location may be. For example, the host processing system, the processing module, or any combination thereof, can include a list of valid global locations (e.g. GPS coordinates, countries, regions, etc.) to use the information handling system. In another form, a list of valid locations can be stored at a data center that can be accessed by a communication module of the processing module, the host processing system, or any combination thereof.

The method can proceed to decision block 308, and detects whether a valid location may be determined. For example, if the information handling system is located within a region that may not be authorized to use the information handling system, the method can proceed to block 310, and the host processing system can be disabled. For example, a processing module can be used to detect whether a valid location may be detected, and if a valid location may not be detected, the processing module can disable access to the host processing system, and the information handling system. As such, the processing module can be used to protect information stored on, or accessible to, the host processing system and information handling system. The method can then proceed to block 312 and ends.

If at decision block 308, a valid location may be detected, the method can proceed to block 314, and user credentials can be detected. For example, a user may input a user name and password, use an access card, key, fob, input a biometric parameter, or various other credentials that can be used to enable access to the information handling system. Upon the user inputting credentials, the method can proceed to decision block 316, and detects whether the credentials are valid. For example, a processing module can maintain a list of valid credentials that a user can input to access the information handling system. In other forms, a user may have multiple credentials that can be linked and maintained or managed by the processing module. In another form, the processing module can gain access to credentials that may be stored within a datacenter, corporate network data center, or any other type of data center that can be used to maintain credentials. As such, the processing module can access a datacenter to verify credentials without having to enable the host processing system.

If the credentials cannot be validated, the method can proceed to block 318, and the host processing system can be disabled. For example, a host processing system, information handling system, or portions thereof, can be disabled. In a form, the processing module can disable access to portions of the host processing system thereby disabling use of the information handling system. Upon detecting valid credentials, the method can proceed to block 322, and detects a global network location of data received by the information handling system. For example, the host processing system, processing module, or any combination thereof can include one or more communication modules operable to communicate with a network. As such, a global network location of data communicated to the information handling system can be detected by accessing data packets, header information, payloads, or any combination thereof within the data. Upon receiving data from a global network location, the method can proceed to decision block 324, and detects whether a global network location may be valid. For example, the data can be coupled to the processing module, and a global network location identifier within the data packet can be compared to a list of valid global network locations. A network location can then be detected by comparing the information within the data packets, to valid network locations. For example, the processing module can store a list of valid global network locations that can be used to validate the detected network location. In other forms, a data center accessible to the processing module can be used to validate a global network location of the data.

At decision block 324, if the global network location may not be valid, the method can proceed to block 326, and network traffic or data having the invalid global network identifier can be filtered by the processing module. As such, the processing module can serve as a firewall or security module to the host processing system, and filter invalid data received by a communication module of the host processing system, the processing module, a communication module, or any combination thereof. In another form, a network type can also be detected and filtered as well.

The method can then proceed to block 328, and can detect an encryption to use when communicating data via a network. For example, the global network location, GPS location, user credentials, or any combination thereof, can be used to detect an encryption to use. The method can then proceed to decision block 330, and if an encryption should be altered, the method proceed to block 332, and encryption key to use can be accessed. The method can then proceed to block 334, and use of an encryption key can be enabled. The method can then proceed to block 336, and network communication of the host processing system can be enabled. For example, the processing module can encrypt and decrypt data communicated via a network, and can route network data to the host processing system as needed or required. In other forms, the host processing system can include a communication module that can receive network data, and can route the network data to the processing module. The processing module can then decrypt the network data prior to use by the host processing system. In another form, the processing module can be used to encrypt data to be communicated by a communication module of the host processing system. In this manner, a host processing system need not be tasked with decrypting and encrypting network data.

The method can then proceed to block 338, and the host processing system can be enabled as desired. For example, the processing module can enable portions, none, or all of, the host processing system. According to an aspect, the host processing system may be in a reduced power state. As such, the processing module can enable a portion of the host processing system. The method can then proceed to decision block 340, and detects whether an update may be detected. For example, the processing module can receive an update from a network data center. If an update has not been detected, the method can proceed to block 338, and a user can continue to use the host processing system as desired. If at block 340, an update may be detected, the method can proceed to decision block 342, and detects whether an encryption key update may be detected. If an encryption key update may not be detected, the method can proceed to decision block 346 as described below. If at decision block 342, an encryption key update may be detected, the method can proceed to block 344 and encryption keys can be updated. For example, the processing module can include a memory configured to stored encryption keys that can be used, and a system manager within a data center can communicate an encryption key update to the processing module. In another form, a global location of the information handling system can be communicated to a data center, and the data center can send an encryption key update using the global location. As such, the encryption keys can be updated. In other forms, the processing module can access a memory of the host processing system configured to store encryption keys and can update accordingly.

The method can then proceed to decision block 346 and detects whether to update credentials. If credentials are not to be updated, the method can proceed to block 348. If credential can be updated, the method can proceed to block 350 and credentials can be updated. For example, credentials can be stored within a memory of the processing module, the host processing system, or any combination thereof. In other forms, credentials can be stored and update at a data center. As such, the credentials can be saved at a network location and updated and used via the processing module.

Figure 4:
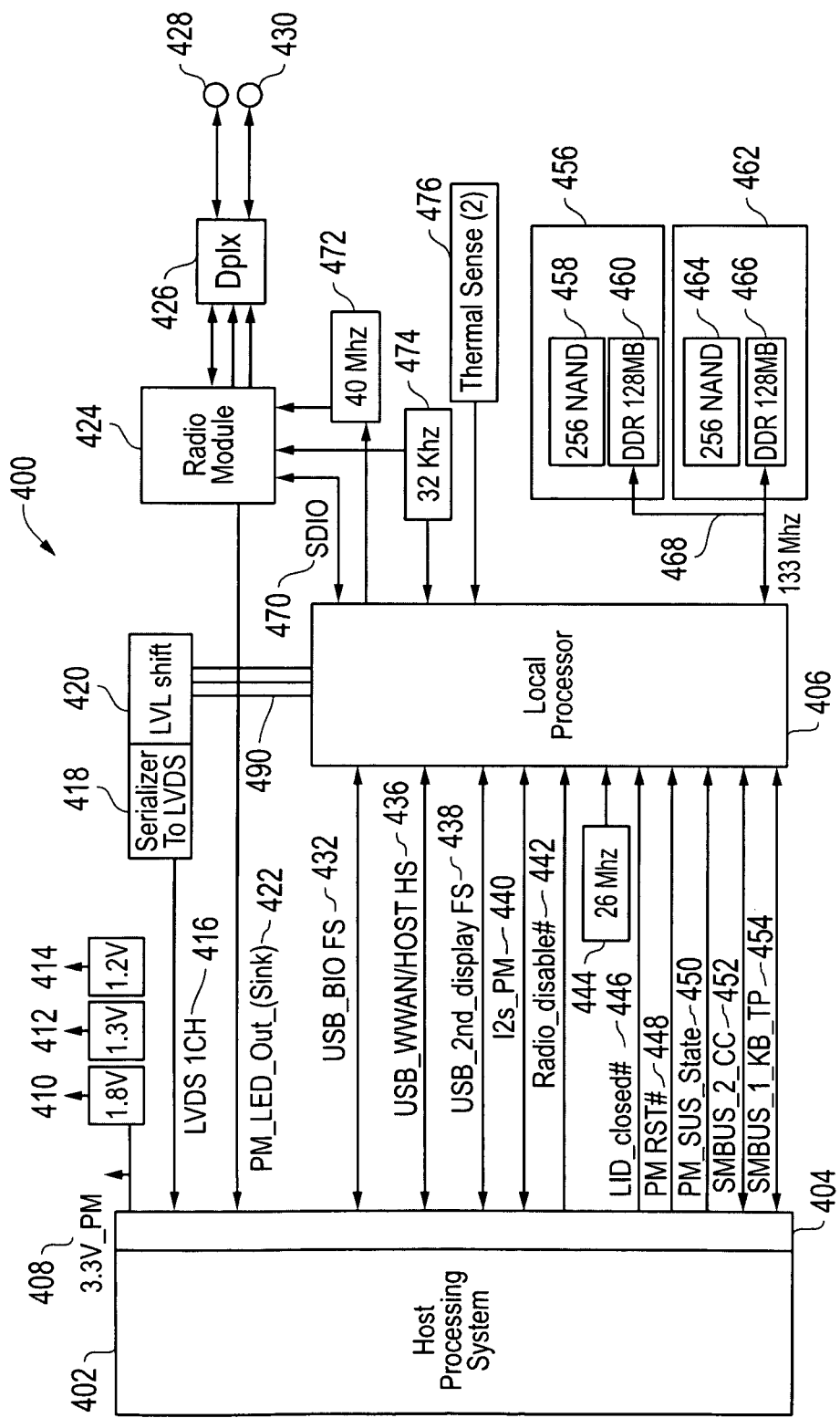
FIG. 4 illustrates a functional block diagram of a processing module coupled to a host processing system according to another aspect of the disclosure.

FIG. 4 illustrates a functional block diagram of a processing module (PM) 400 having a processing module interface 404 operable to be coupled to a host processing system 402 according to an aspect of the disclosure. According to an aspect, the PM 400 can include the PM 102 described in FIG. 1, the PM 290 described in FIG. 2, or any other module that incorporate features of the PM 400. According to an aspect, the processing module interface 404 can be configured to couple various components of the PM 400 and the host processing system 402. According to an aspect, the processing module interface 404 can include a Minicard enabled interface operable to be coupled to a Minicard enabled interface (not illustrated) of a host processing system 402. Other interfaces can also be used. The processing module interface 404 can also include a 3.3 Volt input signal 408 input from the host processing system 402. The 3.3 Volt input signal can be used to generate a 1.8 Volt signal 410, a 1.3 Volt signal 412, and a 1.2 Volt signal 414 to power various components of the PM 400.

According to an aspect, the PM 400 can include a local processor 406 such as a Texas Instruments (TI) OMAP 2430, 3430, Nvidia AP10, AP15, Motorola I.MX 32, 51, or any other processor that can be used as a processor within the PM 400. The PM 400 can also include a 3.3 Volt input signal 408 coupled input from the host processing system 402 via the interface 404. The 3.3 Volt input signal can be used to generate a 1.8 Volt signal 410, a 1.3 Volt signal 412, and a 1.2 Volt signal 414 to power various components of the PM 400.

According to a further aspect, the processing module interface 404 can output a low voltage display signal ("LVDS 1CH") 416 output via a serializer-to-LVDS module 418 and a level (LVL) shift module 420. For example, the serializer to LVDS module and LVL shift module 420 can be operable to convert signals from a parallel type input 490 coupled to the LVL shift 420, to a serialized output using the serializer-to-LVDS module 418. Although described as an LVDS 1 CH signal, an LVDS 2 CH signal, or any combination thereof can be output. According to another aspect, a display port, a high definition media interface (HDMI) enabled port, or any combination thereof can be also used, and signals output can be converted as needed or desired. The LVL shift module 420 can be coupled to the local processor 406 via a data bus 490. In another form, the LVL shift module can be incorporated as a part of the local processor 406. The processing module interface 404 can further include a radio synch signal ("MMPM_LED_OUT_(Sink)") 422 output by a radio module 424. The radio module 424 can be configured as a WIFI (e.g. B, G, etc.) radio and can be coupled to a duplex module 426 operable to receive signals from a first antenna 428 and a second antenna 430. The radio module 424 can be integrated as a part of the local processor 406, or in other forms can accessed as a resource of the local processor 406. According to a further aspect, the duplex module 426 can be configured to duplex signals of the antenna 428 and the antenna 430. For example, each antenna 428 and 430 and can be activated and deactivated independently or in combination, and used via the radio module 424 in response to an operating condition of the local processor 406 and a desired signal to be sent or received.

The processing module interface 404 can also include a USB link operable to communicate a USB BIOS signal ("USB_BIOS FS") 432 between the processing module interface 404 and the local processor 406. The processing module interface 404 can also be used to couple a WWAN—Host signal ("USB_WWAN/HOST HS") 436 to the local processor 406 using a USB link. The processing module interface 404 can also be used to couple a secondary display signal ("USB_2nd_display FS") 438 to the local processor 406 using a USB link.

The processing module interface 404 can also be used to couple an I²S enabled signal ("I2S_PM") 440 to the local processor 406. The processing module interface 404 can also be used to couple a radio disable input signal ("Radio_disable#") 442 to the local processor 406. The local processor 406 can receive a twenty-six megahertz clock signal 444 from a local crystal or other clocking device. The processing module interface 404 can also couple additional signals to the local processor 406 that can include a reset signal ("PM_RST#") 448, can be used to reset the module 400, components within, or any combination thereof. The PM_RST# signal 448 can also be used to reset the host processing system 402, and components thereof. The PM_RST # signal 448 can be enabled as a shared signal or as a non-shared signal accessible by the host processing system 402, the local processor 406, or any combination thereof. A "PM_SUS_State" signal 450 can include a suspend signal to alter a state of the PM 400 and can be used to enable or recover from a suspend state. For example, the PM 400 can be placed in a suspend state and recoverable using the PM_SYS_State signal 450. In another form, the PM_SYS_State 450 signal can be used to enable the host processing system 402 or components thereof The PM_SYS State 450 can be enabled as a shared signal or as a non-shared signal accessible by the host processing system 402, the local processor 406, or any combination thereof.

According to a further aspect, the processing module interface 404 can include a "SMBUS_2_CC" signal 452 that can be used as a command control bus operable to couple control information between the host processing system 402 and the local processor 406. The SMBS_2_CC signal 452 can be used to control audio volume, LCD brightness, etc. of the host processor 402. The interface 404 can also include a "SMBUS_1_KB_TP" signal 454 operable to be couple keyboard touchpad interface signals that can be read by a controller of a keyboard, touchpad, etc. and converted and coupled to the local processor 406.

According to a further aspect, the local processor 406 can access a resource module 456 including 256K NAND memory 458 and 128 MB of DDR memory 460. The local processor 406 can also be coupled to a resource module 462 including 256K NAND memory 464 and 128 MB of DDR memory 466. Each resource module 456 and 462 can be coupled to the local processor 406 using a 133 MHz data bus 468. Other memory sizes and data bus speeds can also be used.

According to a further aspect, the local processor 406 can also be coupled to the radio module 424 using an SDIO bus 470. The local processor 406 can further output a 40 MHz clock signal 472 that can be coupled to the radio module 424. A 32 KHz signal 474 can further also be coupled to the radio module 424 and the local processor 406 to synchronize signal timing. A thermal sense input 476 can also be coupled to the local processor 406 to monitor operating temperature of the PM 400.

According to a particular aspect, the local processor 406 can be used to output a video output signal to be displayed using an external display of the host processing system 402. For example, the local processor 406 can format a video output and output a video output signal using the secondary display signal 438. As such, the secondary display signal 438 can couple the video output signal to the host processing system 402 to be displayed using an external display. In this manner, the local processor 406 can be used during a reduced operating state of the host processing system 402 to output video using a second display as desired.

According to another aspect, the resource modules 456, 462 can store various applications or peripheral sources can include PC radio emulations, transcoders, encryption applications, security modules, GPS applications, biometric applications, camera applications, USB concentrator applications, Voice-Over-Internet Protocol (VOIP) applications, persistent hardware assisted virtual management, wake events, system management applications, one or more operating systems, file systems, various other peripheral resource applications and devices, patches, virus scanning software, security applications, or any combination thereof According to a further aspect, the local processor 406 can also incorporate the resource module 456, the resource module 462, or any combination thereof Additionally, the processing module interface 404 can couple a lid status signal ("LID_closed #") 446 to indicate whether a lid of the host processing system 402 may be opened or closed. For example, the host processing system 402 can include a laptop or other portable system that includes a lid with a display integrated along an internal portion. As the lid is opened, the host processing system 402 can couple an input using lid status signal 446 to the local processor 406, and the local processor 406 can couple a video output signal to be output using the LVDS 1 CH signal 416. As a user closes the lid, a signal can be coupled to the lid status 446 indicating that the lid has been closed. The local processor 406 can also couple a video output signal to the second display signal 438 that can be coupled to a second display such as an external display (not illustrated). In this manner, a second display, such as an external display provided along an external portion of the housing of the host processing system 402 can output a video output signal as the lid is closed.

According to a further aspect, the host processing system 402 can access resources of the PM 400 as a peripheral device. For example, the host processing system 402 can access resources of the PM 400 and offload processing, expand functionality, augment or complement features of the host processing system 402. During a run-time operating environment of the host processing system 402, the host processing system 402 can be coupled to the PM 400 using a peripheral communication bus such as a USB BIOS FS (full speed) signal 432 operable to be enabled during a peripheral operating mode of the PM 400. For example, a digital camera (not illustrated) can be coupled to the local processor 406 and enabled via the local processor as a peripheral device using the USB BIOS FS 432.

According to another aspect, the PM 400 can be used as a separate or auxiliary system to the host processing system 402 when the host processing system 402 may be operated in a reduced operating mode. For example, a user may desire to access a PM 400 resource when the host processing system 402 may be in a reduced operating mode. As such, the PM 400 can be enabled and the local processor 406 can access and enable resources of the PM 400 without having to initialize the host processing system 402 to a run-state operating mode.

Figure 5:
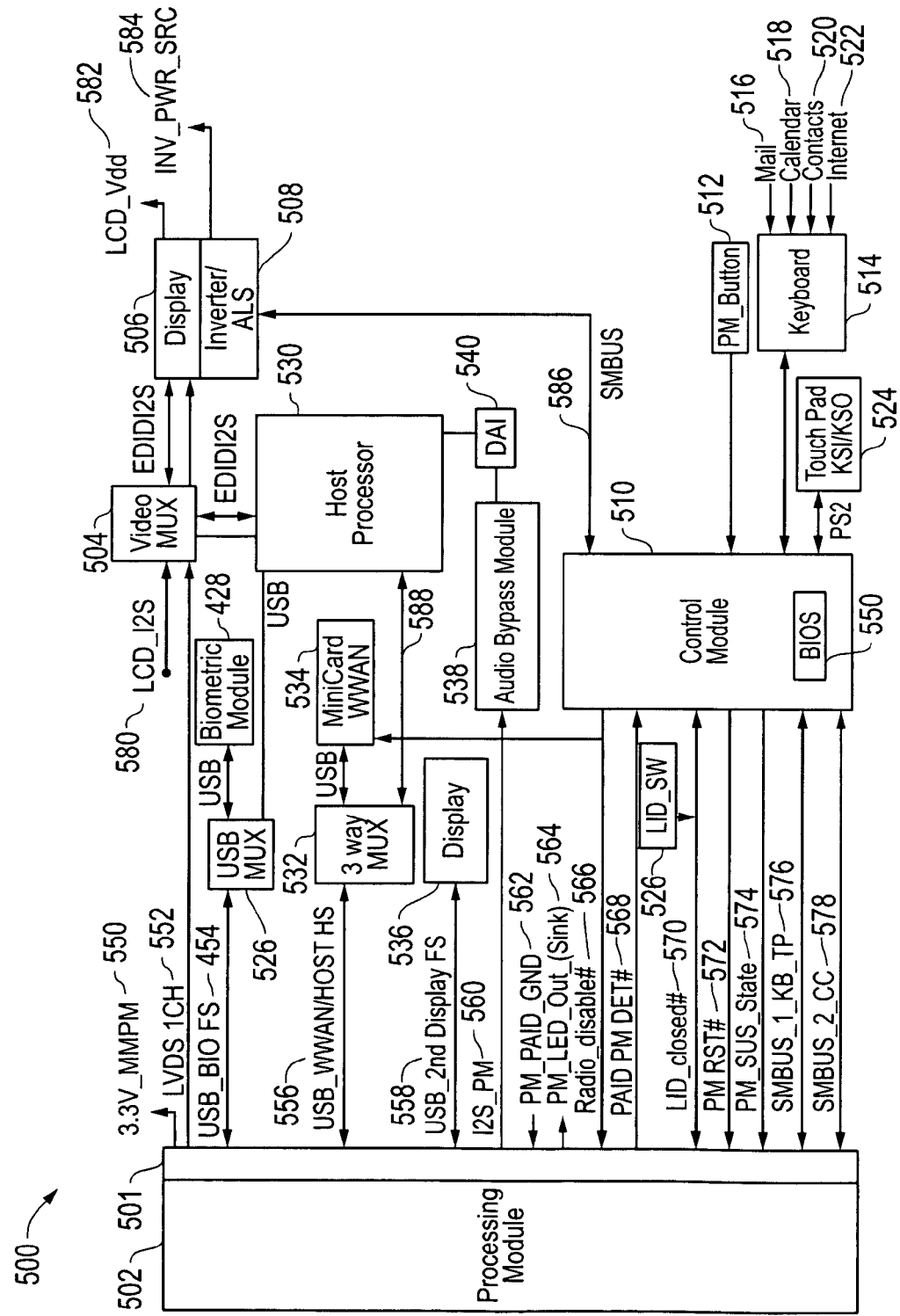
FIG. 5 illustrates a functional block diagram of an information handling system employing a host interface configurable to be coupled to a processing module according to an aspect of the disclosure.

FIG. 5 illustrates a functional block diagram of an information handling system employing a host interface configurable to be coupled to a remote processing module according to an aspect of the disclosure. An information handling system, generally illustrated at 500, can employ a host interface 501 configurable to be coupled to a processing module (PM) 502 according to an aspect of the disclosure. The PM 502 can include the processing module 102 described in FIG. 1, the processing module 290 described in FIG. 2, processing module 400 described in FIG. 4, or any other module that can be coupled to the host interface 501.

According to an aspect, the host interface 501 can be coupled to a video multiplexer 504 operable to multiplex and output a single channel low voltage display signal (LVDS 1 CH) output by the PM 502 to be displayed using the display 506. The information handling system 500 can also include a control module 510 that can include an SIO integrated flash module that can include a BIOS 550 operable to be used to initiate various resources of the information handling system 500. The inverter and ALS module 508 can be coupled to the control module 510 via an SMBUS. The control module 510 can also be coupled to a PM power button 512 operable to initiate a remote processor operating mode of the information handling system 500 using the PM 502. The control module 510 can also be coupled to a keyboard 514 that can include a qwerty keyboard having a mail button 516, a calendar button 518, a contacts button 520, and an Internet access button 522. Each button 516, 518, 520, and 522, alone or in combination, can be configured as a separate module or a part of another portion of the information handling system 500. The keyboard 514 can also include various other types of function keys as needed or desired. According to an aspect, the display 536 can be a touch screen enabled display and can couple an input to the control module 510.

The information handling system 500 can also include a USB MUX 526 coupled to a biometric module 528 operable to input biometrics of a user. The USB MUX 526 can further be coupled to a host processor 530 of the information handling system 500, and the host interface 501.

In another embodiment, an "LCD_I2S" signal can be coupled directly to the PM 502 and can be selectively enabled by the PM 502 and can be used to identify a type of display installed. For example, a display classification can be determined and read using the LCD_I2S input 580. As such, a video output format can be determined to be output to the display 506. The video MUX 504 can couple multiplexed signals to the display 506 powered by a display power source ("LCD_Vdd") 582. The display 506 includes an inverter and ALS module 508 powered by an inverter power source ("INV_PWR_SRC") 584.

The control module 510 can also be coupled to a touchpad 524 that enables use of a pointer or pointing device that can be displayed on the display 506. The control module 510 can also be coupled to a lid switch ("LID_SW") input 526 operable to alter a signal when a lid or display of the information handling system 500, other type of mobile information handling system, may be opened or closed.

According to a further aspect, the host interface 501 can also include the audio bypass ("I2S_BLT") input 538 coupled to an audio bypass module 538. The audio bypass module 538 can be coupled to a digital audio interface (DAI) module 540 via an I²S bus. The DAI module 540 can further be coupled to the host processor 530 via the I²S bus.

According another aspect, the host interface 501 can also include various other inputs, outputs, or combinations thereof. For example, the host interface 501 can include a voltage source input ("3.3V_PM") 550, a USB enabled biometric link ("USB_BIO FS") 554, a USB enabled WWAN and host processing system link ("USB_WWAN/HOST HS") 556, a USB enabled second display link ("USB_2nd Display FS") 558, a I²S ("I2S_PM") input 560, a ground input ("PM_PAID_GND") 562, and an RPI LED ("PM_LED_Out (Sink)") output 564.

The host interface 501 can also include a radio disable ("Radio_disable #") input 566, a paid detection ("PAID_PM_DET#") input 568, a PM reset ("PM_RST#") input 572, a PM sustain state ("BLT_SUS_State") input 574, a SMBUS keyboard enable ("SMBUS_1_KB_TP") link 576, and an SMBUS 2 CC ("SMBUS_2_CC") link 578.

According to a further aspect, the WWAN access ("USB_WWAN/HOST HS") link 556 can be coupled to a three (3) way MUX 532. The Minicard WWAN 534 can be configured to be coupled to the host processor 530 using a USB enabled bus. The PM 502 can also be coupled a display 536 using display ("USB_second display") link 558.

According to another aspect, the PM 502 can output a video output signal using the LVDS 1 CH signal 552. Additionally, the video output signal can be coupled to the video multiplexer 504 to be displayed using the display 506. In another form, the display 506 can be placed in a non-operating mode. For example, the host processor 530 can be placed in a reduced operating state, and the display 506 can also be placed in a reduced operating state. One example can include the lid of a laptop being closed. As such, the PM 502 can detect the lid being closed, and couple a vide output signal to the USB_2nd Display FS signal 558 to be output to the display 536. In this manner, the host processor 530 and the display can in a reduced operating state, and the PM 503 can be used to access the display 536 to output a video signal as desired.

According to a further aspect, the information handling system 500 can access resources of the PM 502 as a peripheral device. For example, the information handling system 500 can access resources of the PM 502 and offload processing, expand functionality, augment or complement a features of the information handling system 500. During a run-time operating environment of the information handling system 500, the information handling system 500 can be coupled to the PM 502 using a peripheral communication bus such as USB BIOS FS 554. As such, the information handling system 500 can access resources of the PM 502 as single, or a combination of, peripheral devices.

According to another aspect, the PM 502 can be used as a separate or auxiliary system to the information handling system 500 when the information handling system 500 may be operated in a reduced resource or reduced-state operating mode. For example, a user may desire to access the PM 502 resource when the information handling system 500 may be in a reduced operating mode.

According to another aspect, the PM 502 can output a video output signal and an audio output signal during a reduced operating condition of the host processor 530. For example, the PM 502 can output a video output signal to the display 536, and can further output an audio signal to the audio bypass module 538 which can be activated during the reduced operating condition of the host processor 530. In other forms, the audio bypass module 538 and associated components sufficient to output audio can be enabled and disabled in response to a lid of the information handling system being opened and closed.

During operation, PM 502 can be configured to can detect a user initiated event, a non-user initiated event, or any combination thereof. For example, a user initiated event can include a user activating a key, button, or other type of hardware, software, or user selectable interface, or combinations thereof, that can generate a user activated event. For example, a user can select a button to access a messaging application of the information handling system 500. As such, the PM 502 can detect a request to access the messaging application and the PM 502 can initiate access to resource of the information handling system 500 during a reduced operating state of the information handling system 500.

According to another aspect, the PM 502 can detect a non-user initiated event. For example, the information handling system 500 can employ the Minicard WWAN 534 operable to receive communication signals via a wireless communication. The Minicard WWAN 534, coupled to the PM 502, can detect the non-user initiated event. The PM 502 can identify a resource profile (not illustrated) of the detected event, and initiate activation of resources of the information handling system 500 to process the non-user initiated event.

In another form, the information handling system 500 can detect a non-user initiated event communicated to an electronic device other than the information handling system 500 during a reduced operating state of the information handling system 500. For example, the PM 502 can be configured to detect a message formatted to be received by a smart phone device, Blackberry device, or any type of electronic device configured to receive messages. For example, the information handling system 500 employing a Minicard WWAN 534 can be operable to detect wireless messages communicated via any wireless network operable to communicate messages. For example, a wireless messaging network such as an SMS network, Blackberry enabled network, or any other type of messaging enabled wireless or wireline network.

In an exemplary form, the information handling system 500 can be operating in a low-power operating state that can include sufficient resources to detect a wireless signal. As such, the PM 502 and control module 510 can be used to determine a current operating state of the information handling system 500, and can initiate enabling resources to process and output a response to the received wireless signal. As such, an operating environment to output a response to a message, such as a Blackberry message, can be enabled using a limited amount of resources without having to initialize additional resources of the information handling system 500. For example, the PM 502 in combination with the control module 510 can be used to enable access to the display 506 to output a received message. Additionally, the keyboard 514 or other devices or components of the information handling system 500 can be powered to enable a user to view and respond to a message. As such, a limited resource operating environment can be generated to enable receipt and response to messages without having to initialize the information handling system 500. In this manner, a laptop or notebook system can be used to receive messages that may be intended for a Blackberry or other type of messaging device, thereby allowing a user to view messages using a larger display relative to the Blackberry device or smart phone device, and draft and respond to messages using the keyboard 514 and the display 506 as desired.

According to a particular aspect, the information handling system 500 can enable the PM 502 as a peripheral device accessible to the host processor 530 or other components of the information handling system 500. For example, the host processor 530 can be operated in a run-time operating mode, and can further access one or a combination of independent peripheral resources of the PM 502 as peripheral resource or device. For example, the host processor 530 can offload processing or applications to the PM 502 by using the PM 502 as a peripheral device. Various peripheral devices or applications the PM 502 can be enabled including PC radio emulations, transcoders, encryption applications, GPS applications, biometric applications, camera applications, USB concentrator applications, VOIP applications, persistent hardware assisted virtual management, wake events, system management applications, various other peripheral resource applications and devices, or any combination thereof. In various forms, the PM 502 can employ applications, devices, modules, or any combination thereof as a peripheral resource.

Figure 6A:
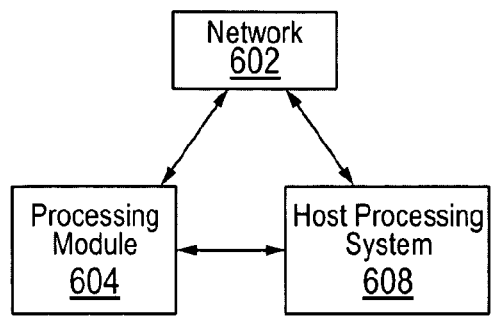
FIG. 6A to 6D illustrates functional block diagrams of enabling security using a network operable to be connected to a processing module and host processing system according to an aspect of the disclosure.

FIG. 6A to 6D illustrates functional block diagrams of enabling security using a network operable to be connected to a processing module and host processing system according to an aspect of the disclosure. With reference to FIG. 6A, a network 602 can include a wireless network, wireline network, or any combination thereof, that can be coupled to a processing module 604, a host processing system 608 or any combination thereof. As illustrated, a closed communication loop can be established between the network 602, the processing module 604, and the host processing system 608. Other topologies can also be realized. In other forms, the network 602 need not be a single network and can include multiple networks. For example, the processing module 604 can communicate using a secure network while the host processing system 608 can communicates over a non-secure network.

In another form the network 602 can validate security metrics, such as credentials, physical locations, or various other security metrics, or any combination thereof described herein, or capable of being deployed by the network 602, the processing module 604, the host processing system 606. For example, the network 602 can enable access to files, encryption-keys, passwords, and various other types of secure information, or any combination thereof, upon validating a security metric. For example, the network 602 can be used to determine whether security sensitive information can be communicated using the processing module 604, the host processing system 608, or any combination thereof. For example, if the processing module 604 can be used to communicate secure information, the processing module 604 can enable, disable, alter operating conditions of resources of the host processing system 608. For example, the processing module 604 can disable a communication module and associated resources of the host processing system 608 to disable communication with the network 602 or another network. As such, the processing module 604 can be enabled to communicate with the network 602 and resources of the host processing system 608 can be disabled to ensure secure communication.

Figure 6B:
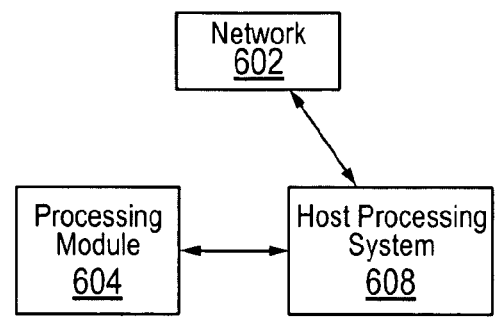

FIG. 6B illustrates an embodiment of enabling security by disabling direct communication between the processing module 604 and the network 604. For example, the processing module 604 may not have access to a secure network. However, the host processing system 608 can include resources accessible to the processing module 604 which can be enabled and used to communicate with the network 602. As such, the processing module 604 can enable resources of the host processing system 608 sufficient to access the network 602. Information can then be communicated from the network 602 to the host processing system 608, and coupled to the processing module 604 to be processed as needed or desired.

Figure 6C:
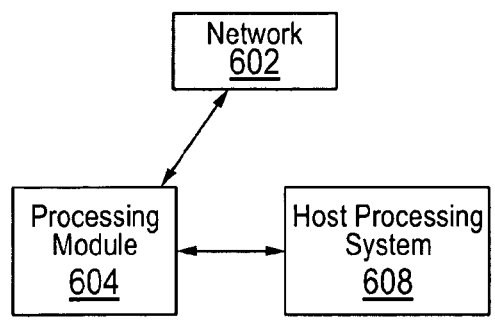

FIG. 6C further illustrates accessing the network 602 using the processing module 604 and the host processing system 608. For example, the host processing system 608 may desire to access the network 602. Further, the host processing system 608 may not be able to access the network 602 directly, and can use the processing module 604 to access the network 602. For example, the host processing system 608 may not have one or more resources necessary to access the network 602, or may not be able to access the network 602 with sufficient security. As such, the processing module 604 can access the network 602, and communicate information between the network 602, and the host processing system 608.

Figure 6D:
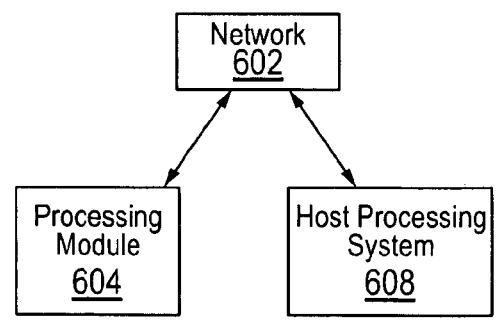

Referring to FIG. 6D, information can be communicated between the processing module 604 and the host processing system 608 using the network 602. For example, the processing module 604 may not be able to access the host processing system 608 directly. As such, the processing module 604 can communicate with the network 602, and access, enable, disable, or any combination thereof, resources of the host processing system 608. As such, the processing module 604 can be physically coupled to the host processing system 608, and can further output a signal to the network 602 that can be used to access resource of the host processing system 608. As such, the processing module 604 can initiate enabling and disabling resources using the network 602, and if desired, a communication link between the processing module 604 and the host processing system 608 can be established.

Figure 7:
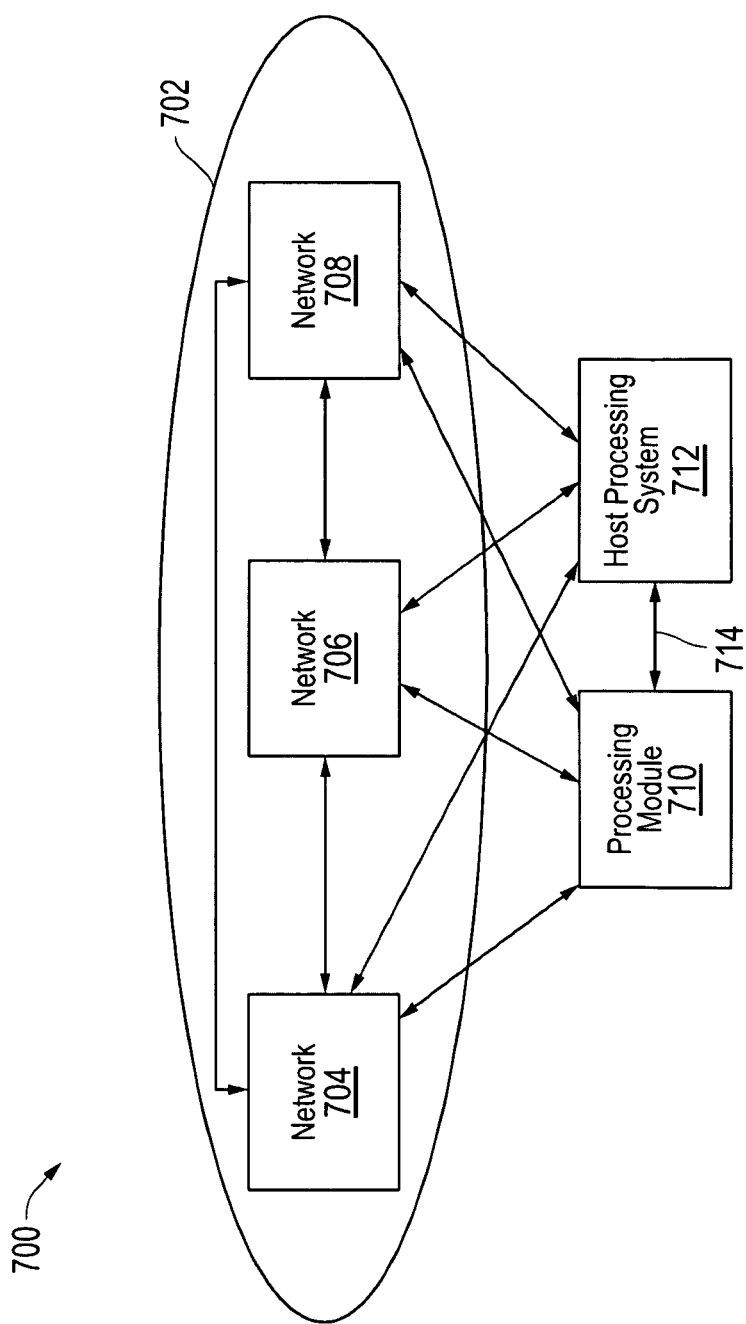
FIG. 7 illustrates a functional block diagram of enabling security within multiple available networks according to an aspect of the disclosure.

FIG. 7 illustrates a functional block diagram of enabling security within multiple available networks according to an aspect of the disclosure. An information handling system, generally illustrated at 700, can include a network cloud 702. The network cloud 702 can include one or more network locations, various network types including wireless and wireline networks, network resources, enterprise networks, public networks, private networks, or any other type of network or resource that can be used within a network cloud 702. Resources within the network cloud 702 are illustrated generally as network 704, network 706, and network 708. The information handling system 700 can also include a processing module 710 operable to be coupled to a host processing system 712 using a link 714. The link 714 can include a data link, a command link, a control link, or any combination thereof. Additionally, the processing module 710, the host processing system 712, or any combination thereof, can be coupled to the network cloud 702 using a link 714 that includes one or more types of links or equivalent data or communication links that can be used to provide a command link, data link, control link or any combination thereof.

According to an aspect, the processing module 710 can be coupled to the network cloud 702 and one or more networks 704, 706, 708 as needed or desired. Additionally, the host processing system 712 can be coupled to the network cloud 702 and one or more network 704, 706, 708 as needed or desired.

During operation, the host processing system 712 can access the processing module 710 to access the network cloud 702. For example, the processing module 710 may be coupled to the network 704, and the host processing system 712 may not be able to directly access the network 704 (e.g. invalid security credentials, access capabilities, resource availability, network location, geographical location, etc.). As such, the host processing system 712 can access the network 704 using the processing module 710.

In another form, the processing module 710 can access an encryption key to communicate information using a secure network connection to the network cloud 702. For example, a user may desire to access a network location that stores a secure file or other information using the host processing system 712. If the host processing system 712 does not have a secure network connection, or be capable of a secure network connection, the processing module 710 can access the cloud 702 using a secure network connection.

In another form, the host processing system 712 can be coupled to the network 704 and may desire to communicate using a secure network connection. The processing module 710 may have a secure network access to the network 708. Additionally, the network 704 may have a secure connection to the network 708. As such, secure information can be communicated from the network 704 to the network 708. The processing module 710 can then receive the secure information from the network 708 using a secure connection, and couple the information to the host processing system 712. Various other combinations of access between the network cloud 702, the networks 704, 706, 708, the processing module 710, the host processing system 712, or any combination thereof, can be used or combined to communicate secure information between the processing module 710, the host processing system 712, and the network cloud 702.

According to another aspect, one or more of the network 704, 706, 708 can monitor activities of either or both of the processing module 710 and the host processing system 712, and enable or disable resources as needed or desired. For example, the network 704 can detect whether the host processing system 712 may be used in an unsecure or low secure environment. The network 704 can send a communication to the processing module 710 to initiate altering use of the host processing system 712. For example, the network 704 can send a communication that includes commands or command information that can be used by the processing module 710. The processing module 710 can identify the request to alter an operating condition of the host processing system 712, and activate or send command and control signals sufficient to disable specific resources of the host processing system 712. In this manner, the network cloud 702, the network 704, 706, 708, or any combination thereof can monitor activities of the host processing system 712, the processing module 710, or any combination thereof, and activate and deactivate resources as needed or desired.

In another form, the host processing system 712 can access encryption keys stored or accessible to the processing module 710 prior to encrypting information to communicate. For example, the processing module 710 can access encryption keys or other security enabling information, credentials, passwords, etc. operable to be used to ensure secure communication. The processing module 710 can store such information, or can access the network cloud 702, the network 704, 706, 708 or any combination thereof. The processing module 710 can also provide the security information to the host processing system 712 as desired, and enable, disable, or alter an operating condition of resources of the host processing system 712 in association with communicating secure information.

Note that not all of the activities described above in the general description or the examples are required, that a portion of a specific activity may not be required, and that one or more further activities may be performed in addition to those described. Still further, the order in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A processing module comprising:
    a local processor device configurable to initiate access to resources of a host processing system; and
    a security module configured to enable use of the resources of the host processing system using a security metric, wherein the security module is further configured to:
    detect the security metric;
    detect a global location of the host processing system and compare the global location to a list of valid global locations;
    enable and disable access to a hardware resource of the host processing system not only in response to the security metric but also based on whether the host processing system is in a low-power operating state or a run operating state, wherein the enabling access to the hardware resource when the host processing system is in the low-powered operating state comprises leaving the host processing system in the low-powered operating state if the host processing system entered the low-powered operating state prior to a disabling of access to hardware resource initiated by a signal from the processing module.

2. The processing module of claim 1, further comprising the security module operable to:
    enable use of the hardware resource during low-powered operating state of the host processing system in response to validating the security metric; and
    enable use of a plurality of hardware resources of the host processing system during a run operating state of the host processing system in response to validating the security metric.

3. The processing module of claim 2, further comprising:
    a wireless communication module configured to receive wireless data from a network location;
    an interface configured to receive data received by the host processing system; and
    wherein the security module is configured to:
        detect a global network location of the received wireless data and the received data;
        compare the global network location of the received wireless data to a list of valid global network locations;
        disable use of the received wireless data in response to an invalid global network location;
        compare the global network location of the received data to the list of valid global network locations; and
        disable use of the received data in response to an invalid network location.

4. The processing module of claim 1, further comprising a location identifier module operably coupled to the security module, wherein the location identifier module is configured to:
    detect a global location of the host processing system; and
    enable the hardware resources of the host processing system in response to validating the global location.

5. The processing module of claim 1, further comprising a wireless communication module accessible to a remote system manager configured to initiate enabling and disabling use of the host processing system using the security metric.

6. The processing module of claim 5, further comprising:
    a housing storing the security module, the local processor, and the wireless communication module; and
    an interface between the housing and the host processing system configured to be removeably coupled to a host interface of the host processing system wherein the processing module is external to the host processing system.

7. The processing module of claim 1, wherein the hardware resource comprises a communication module of host processing system.

8. The processing module of claim 1, wherein the hardware resource comprises a keyboard of the host processing system.

9. The processing module of claim 1, wherein the security metric is biometric.

10. A method comprising:
    detecting, by a processing module including a local processor device, an operating state of an information handling system to be one of a low-powered operating state and a run operating state;
    detecting a global location of the information handling system;
    comparing the global location to a list of valid global locations; and
    altering an operating state of a hardware resource of the information handling system not only in response to the comparison but also the operating state of the information handling system wherein, when the information handling system is in the low-powered operating state prior to a disabling of access to hardware resources by the processing module, the altering the operating state of the hardware resource comprises leaving the information handling system in the low-powered operating state.

11. The method of claim 10, further comprising:
    detecting the current operating state of the information handling system as a low-powered operating state; and
    enabling the hardware resource of the information handling system based on a valid global location of the information handling system.

12. The method of claim 10, further comprising:
    detecting a global network location of the information handling system;
    detecting a security access level of the global network location;
    comparing the global network location to a list of valid global network locations;
    enabling the hardware resource in response to determining the global network location is a valid global network location; and
    disabling the hardware resource in response to determining the global network location is an invalid global network location.

13. The method of claim 10, further comprising:
    detecting the information handling system in a run operating mode;

detecting a global network location of the information handling system;
detecting an invalid global network location; and
disabling use of the information handling system in response to detecting the invalid global network location.

14. The method of claim 10, further comprising:
receiving data using a communication module of a host processing system of the information handling system;
routing the data to the processing module;
detecting whether the data is communicated from a valid global network location; and
disabling use of the data upon detecting the global network location is invalid.

15. The method of claim 10, further comprising:
receiving data using a communication module of a host processing system of the information handling system;
routing the data to the processing module;
detecting whether the data is communicated from a valid global network location; and
enabling use of the data upon detecting the global network location is valid.

16. The method of claim 10, further comprising:
receiving a user credential at the information processing system;
outputting the user credential from a processing module coupled to the information handling system to a network data center;
receiving validation of the user credential from the network data center at the processing module; and
enabling use of the information handling system using the processing module in response to validating the user credential.

17. The method of claim 10, wherein the information handling system contains a processor other than the local processor.

18. An information handling system comprising:
a host processing system including resources operable to be enabled and disabled by a processing module; and
a host interface configured to:
couple the processing module to the host processing system; and
detect a global location of the host processing system and compare the global location to a list of valid global locations;
receive a signal, by a local processor device, from the processing module to initiate enabling and disabling hardware resources of the host processing system not only in response to a security metric value detected by a security module of the processing module but also based on whether the information handling system is in low-powered operating state or a run operating state, wherein the enabling access to the hardware resource when the information handling system is in the low-powered operating state comprises leaving the information handling system in the low-powered operating state if the information handling system entered the low-powered operating state prior to a disabling of access to hardware resources initiated by a signal from the processing module.

19. The information handling system of claim 18, wherein the processing module includes:
a memory configured to be updated by the processing module to store updated encryption keys communicated from a network data center;
wherein the memory is further configured to store a user access log including user activity information; and
wherein the memory is further configured to store a list of valid global network locations.

20. The information handling system of claim 19, further comprising:
the processing module configured to analyze network data packets received by a wireless communication module or a wireline communication module of the host processing system;
the security module further configured to validate a global network location of the network data packets;
the processing module further configured to filter invalid network data packets from the network data packets of the network data packets; and
the processing module further configured to enable use of non-filtered valid network data packets of the network data packets.

* * * * *